Patented Nov. 8, 1949

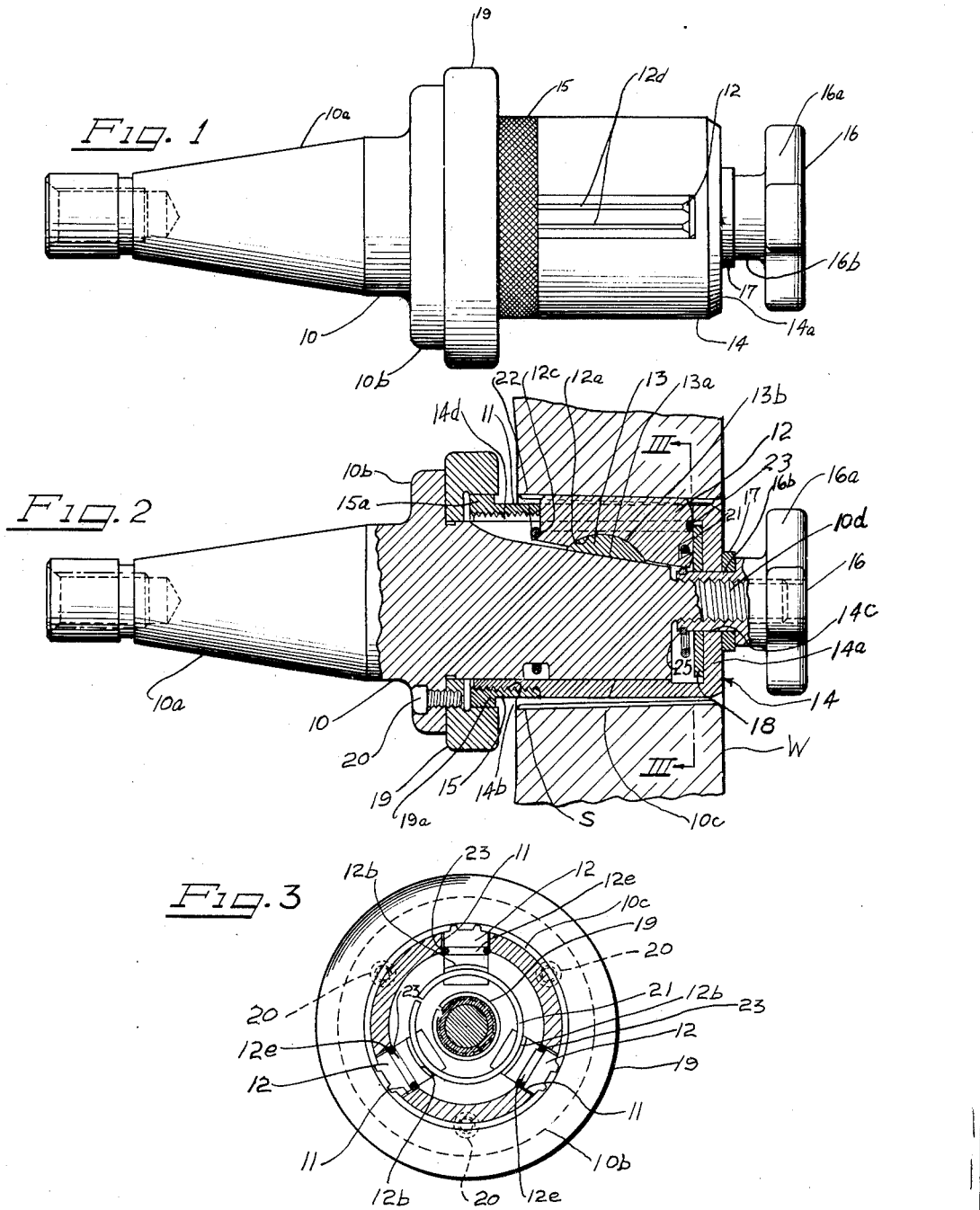

2,487,723

UNITED STATES PATENT OFFICE 2,487,723

EXPANDING SPLINE ARBOR

Bror Arne Nordstrom, Cleveland, Ohio, assignor to Thompson Products, Inc., Cleveland, Ohio, a corporation of Ohio Application May 27, 1948, Serial No. 29,424

9 Claims. (Cl. 279—2)

1

This invention relates to an expansible arbor or mandrel, and particularly to an expansible arbor for use in supporting workpieces having a tapered bore.

Many expansible arbor constructions have heretofore been proposed which operate upon the fundamental principle of axially shifting a jaw element along a variable depth slot to thereby expand the jaw element into tight engagement with the bore of a workpiece. Such expansible arbors or mandrels are desirable not only for the fact that they may be employed for supporting workpieces having a wide range of bore diameters, but also for the fact that at the conclusion of the machining operation upon the particular workpiece, the mandrel may be collapsed and withdrawn from the workpiece bore with greater ease than the conventional solid mandrel.

Heretofore, no satisfactory expansible arbor construction has been known which would permit a single expansible arbor unit to be employed for mounting different workpieces having tapered bore surfaces which may vary either in average diameter or degree of taper. Obviously, while a conventional expansible arbor construction could conceivably have the exterior surfaces of its jaw elements ground to simulate a specific internal taper of a particular workpiece, such arbor could then be utilized only with workpieces having an identical degree of taper in their bore surfaces. Such arbor would not satisfactorily support any workpiece having a tapered bore surface with a different degree of taper than that for which the external surfaces of the jaw elements of the expansible arbor were ground.

Accordingly, it is an object of this invention to provide an improved expansible arbor construction, particularly a construction which will permit the arbor to accommodate a plurality of workpieces having tapered bore surfaces which may vary either in average diameter or in degree of taper.

Another object of this invention is to provide an improved expansible arbor construction characterized by the provision of an apertured sleeve mounted in surrounding relationship to the slotted body portion of the arbor so that the various jaw elements project through apertures in the sleeeve, and the cooperation therewith of a clamping ring to restrain the jaw elements in the sleeve apertures against axial movements, whereby the jaw elements and sleeve move axially as a unit.

Still another object of this invention is to provide an improved seal arrangement for ex-

2 pansible arbors for preventing foreign particles or dirt from entering the restricted spaces between the jaw elements and the walls of the slots.

A particular object of the invention is the provision of a spacer element for supporting the expansible jaws of an expansible arbor in axially extending slots of the body portion of such arbor, and characterized by the forming of the abutting surfaces of each spacer and the cooperating jaw element of an arcuate configuration so as to permit limited tilting movements of such jaw element relative to the body portion, and thus permit the jaw element to accommodate itself to a wide range of tapered bores of workpieces.

The specific nature of this invention as well as other objects and advantages thereof will become apparent to those skilled in the art from the following detailed description of the annexed sheet of drawings which, by way of preferred example only, illustrates one specific embodiment of the invention.

On the drawings:

Figure 1 is an elevational view of an assembled expansible arbor embodying this invention;

Figure 2 is an axial sectional view taken on a plane passing through one of the jaw elements of the expansible arbor construction of Figure 1, and showing the cooperation of such arbor with a workpiece having a slightly tapered bore surface; and Figure 3 is a sectional view taken on the plane III—III of Figure 2.

As shown on the drawings:

An expansible arbor embodying this invention may comprise a body portion 10 having one end 10a thereof of generally conical exterior configuration so as to permit the arbor to be inserted in conventional tapered collets of the type employed on machine tool spindles. An integral shoulder 10b is provided at one end of the tapered portion approximately centrally of the body portion 10, and, on the other side of the shoulder 10a, the body portion is of generally cylindrical configuration as indicated at 10c and terminates in a reduced diameter, externally threaded, axial extension portion 10d. The cylindrical portion 10c is provided with a plurality of angularly spaced, axially extending slots 11 which are of variable depth along the length of the body member 10, having their maximum depth adjacent the threaded extension portion 10d. A jaw element 12 of generally rectangular block-like configuration is mounted in each of the slots 11, and is suitably proportioned so as to be snugly movable axially and radially within such slot. Each of the jaw elements 12 is supported, in accordance with this invention, upon a spacer element 13. Such spacer element has a bottom surface 13a conforming to the bottom surface of the slot 11 and an opposed surface 13b of arcuate configuration, for example, a convex surface constituting a cylindrical segment. The inserted face of each jaw element 12 is suitably shaped so as to conform to and abut the arcuate surface of the spacer 13. Hence in the particular example illustrated, each of the jaw elements is provided with a concave cylindrical segment surface 12a in its inserted face. The recess 12a is so proportioned that each of the jaws is supported slightly above the bottom of its corresponding slot 11 and hence a limited tilting movement of each jaw 12 relative to the body portion 10 is permitted by the spacers 13.

To effect the securement of the jaw elements 12 in assembly with the body portion 10, as well as to effect the expansion and contraction movements of such jaw elements, a cup-shaped sleeve element 14 is provided, the annular wall portions of which are proportioned so as to snugly surround the cylindrical portion 10c of the body 10. The sleeve 14 is provided with suitable apertures 14d in its cylindrical wall to permit the outer ends of the jaws 12 to project therethrough. The rim portion of the cup-shaped sleeve 14 is threaded as indicated at 14b and a retaining ring 15 is screwed onto such threaded portion and adjusted so as to snugly secure the jaw elements 12 against axial movements relative to the cup-shaped sleeve 14.

An adjusting knob 16 is provided which is internally threaded to permit its mounting upon the threaded axial extension portion 10d of the body 10. The adjusting knob 16 has a handle portion 16a and an axially extending stem portion which is reduced at its outer end as indicated at 16b to provide a bearing for the cup-shaped sleeve 14. The cup-shaped sleeve 14 is provided with a central aperture 14c in its base portion 14a which snugly receives the stem portion 16b of the adjusting knob therein. An anti-friction washer 17 is provided between the large diameter portion of the adjusting knob 16 and the outer face of the base 14a of cup-shaped sleeve 14 while an anti-friction washer 18 is provided between the inner face of the base 14a of the cup-shaped sleeve 14 and the end faces of the jaw elements 12. Lastly, a snap ring 25 is mounted in a suitable groove on the extreme end portion of the stem 16b of the adjusting knob 16 to retain the washer 18 thereon when the adjusting knob is moved in a retracting direction.

From the foregoing description, it is apparent that rotation of the adjusting knob 16 in one direction will produce an axial movement of the cup-shaped sleeve 14 and the jaw elements 12 in the direction toward the center of the body portion 10, while rotation of the knob 16 in the opposite direction will produce an axial retraction of the cup-shaped sleeve 14 and the jaw elements 12. Obviously, any movements of the jaw elements 12 and their respective spacers 13 along the slots 11 will produce a radial expansion or contraction of the outer surfaces of such jaw elements.

To further guide the movements of the cup-shaped sleeve 14, a guide ring 19 is mounted in surrounding relationship to the cylindrical portion 10c of the body 10 immediately adjacent to the shoulder 10b and is secured to such shoulder by suitable screws 20. The guide ring 19 has an axially extending annular flange portion 19a which projects in overlying relationship to the ring 15 and engages a radial flange 15a on such ring in bearing relationship. Hence the rim end of the cup-shaped sleeve 14 is adequately supported for its axial movements.

To increase the positioning accuracy of the jaw elements 12, such jaw elements are individually biased inwardly by a pair of split ring spring elements 21 and 22 which respectively engage in suitable notches 12b and 12c provided in opposite end faces of each of the jaw elements 12. Hence the jaw elements are resiliently urged inwardly into snug engagement with their respective spacers 13.

The arbor construction specifically shown in the drawings was purposely constructed to have only a limited range of radial expansion and contraction of the jaw elements 12. A greater range may obviously be conveniently secured by axially lengthening the slots 11 and increasing the axial length of the overhanging flange 19a of the guide ring 19.

When the described arbor construction is inserted in the bore of a workpiece W, which bore may be of slightly tapered configuration, each of the jaw elements 12 will individually adjust itself so that its external exposed surface accurately conforms to the taper of the bore surface S. Such action of the jaw elements 12 is permitted by the tilting movements of such jaw elements relative to the body 10 permitted by the spacer 13. It should be particularly noted, however, that irrespective of such tilting movements, a large surface area of each jaw 12 is in contact with a conforming surface of the spacer 13 and likewise, a substantial area of the spacer 13 is in contact with the bottom of the slot 11. The jaws 12 may be expanded outwardly against the bore surface S by manipulation of knob 16 to grip such surface with a very substantial force without danger of producing local deformation of any of the supporting surfaces of the jaw 12, the spacer 13, or the bottom of the slot 11.

If the arbor is to be employed particularly in connection with supporting workpieces having splined tapered bore surfaces, then, of course, the exterior surfaces 12d of each jaw element 12 will be splined as indicated in Figure 1 to conform to the splines of the workpiece.

When an expansible arbor of the type described is employed in machine tools, it is well known that chips, oil, or dirt, of various forms tend to collect in the slots 11 and hence to interfere with the subsequent expansion or contraction movements of the jaw elements 12 in the slots 11. It should be noted that in the described construction, the slots 11 are substantially concealed from the exterior of the arbor by the ring 15. To further mitigate against the possibility of dirt entering the slots 11, a peripheral groove 12e is formed on each of the jaw elements 12 and a sealing element 23 is mounted in each of such grooves so as to snugly engage the side walls of slots 11 and thus positively prevent the entrance of dirt into the slots through the slight clearance necessarily provided between the side surfaces of the jaws 12 and the side walls of the slots 11.

In addition to securing unitary movements of the jaw elements, the ring 15 serves the further function of clamping the jaw elements 12 rigidly to the body 10 whenever the grinding of the outer surfaces of such jaw elements is required.

From the foregoing description it is apparent that this invention provides an improved expansible arbor construction, and particularly a construction capable of use with a plurality of workpieces having tapered bore surfaces differing both in average diameter or degree of taper. Furthermore, the described construction may be economically manufactured and assembled and, due to the ruggedness of its components and the means provided for preventing dirt from getting into the tapered depth slots, necessarily results in a unit having a substantially greater useful life than any expansible arbor construction heretofore known.

It will, of course, be apparent to those skilled in the art that various details of construction may be modified through a wide range without departing from the principles of this invention and it is, therefore, not the purpose to limit the patent granted hereon otherwise than necessitated by the scope of the appended claims.

I claim as my invention:

1. An expansible arbor comprising a generally cylindrical body portion having a plurality of identical, angularly spaced, axially extending, variable depth slots therein, a sleeve surrounding said slotted portion of the body portion, said sleeve having axially extending apertures therein aligned with said body portion slots, a jaw element mounted in each of said slots and projecting outwardly through said apertures, a ring threadably adjustable on said sleeve and cooperating therewith to clamp said jaws in said apertures against relative axial movements, and means for axially shifting said sleeve and said jaws relative to said body portion, thereby expanding said jaws to engage a workpiece bore.

2. An expansible arbor comprising a generally cylindrical body portion having a plurality of identical, angularly spaced, axially extending, variable depth slots therein, a sleeve surrounding said slotted portion of the body portion, said sleeve having axially extending apertures therein aligned with said body portion slots, a jaw element mounted in each of said slots and projecting outwardly through said apertures, a ring threadably adjustable on said sleeve and cooperating therewith to clamp said jaws in said apertures against relative axial movements, an integral, threaded, axial extension on said body portion, and an adjusting member threaded on said extension and connected to said sleeve and jaws to shift said jaws axially in said slots, thereby expanding said jaws to engage a workpiece bore.

3. An expansible arbor comprising a body member having an elongated variable depth slot therein, a spacer insertable in said slot and having one surface conforming to and abutting the bottom of said slot and an opposed surface of arcuate configuration, a jaw element insertable in said slot and having its inserted face arcuately formed to conform to and abut said spacer arcuate surface, thereby permitting limited tilting movements of said jaw element relative to said body, and means for axially shifting said jaw element and spacer along said slot, thereby varying the radial position of said jaw element.

4. An expansible arbor comprising a body member having an elongated variable depth slot therein, a jaw element snugly insertable in said slot and longitudinally and depthwise movable therein, and spacer means interposed between the inserted face of said jaw element and a bottom surface of said slot, said spacer means being constructed and arranged to permit limited tilting movements of said jaw element relative to said body member, and means for axially shifting said jaw element and said spacer means along said slot, thereby varying the radial position of said jaw element.

5. An expansible arbor comprising a body member having an elongated variable depth slot therein, a spacer insertable in said slot and having a planar face abutting the bottom of said slot and a convex, cylindrical segment surface opposite to said planar surface, a jaw element insertable in said slot and having a concave recess in its inserted face conforming to and abutting said spacer cylindrical segment surface, thereby permitting limited tilting movements of said jaw element relative to said body, and means for axially shifting said jaw element and spacer along said slot, thereby varying the radial position of said jaw element.

6. An expansible arbor comprising a generally cylindrical body portion having a plurality of identical, angularly spaced, axially extending, variable depth slots therein, a sleeve surrounding said slotted portion of said body portion, said sleeve having axially extending apertures therein aligned with said body portion slots, a spacer insertable in each of said slots, each spacer having one surface conforming to and abutting the bottom of the respective slots and an opposed surface of arcuate configuration, a jaw element insertable in each of said slots and having an arcuate surface on its inserted face conforming to and abutting said spacer arcuate surface, thereby permitting limited tilting movements of each jaw element relative to said body portion, said jaw elements also projecting outwardly through said sleeve apertures, a ring threadably adjustable on said sleeve and cooperable therewith to clamp said jaw elements in said apertures for grinding purposes, and means for axially shifting said sleeve, said jaws, and said spacers relative to said body portion, thereby expanding said jaw elements to engage a workpiece bore.

7. An expansible arbor comprising a generally cylindrical body portion having a plurality of identical, angularly spaced, axially extending, variable depth slots therein, a sleeve surrounding said slotted portion of said body portion, said sleeve having axially extending apertures therein aligned with said body portion slots, a spacer insertable in each of said slots, each spacer having one surface conforming to and abutting the bottom of the respective slots and an opposed surface of arcuate configuration, a jaw element insertable in each of said slots and having an arcuate surface on its inserted face conforming to and abutting said spacer arcuate surface, thereby permitting limited tilting movements of each jaw element relative to said body portion, said jaw elements also projecting outwardly through said sleeve apertures, a ring threadably adjustable on said sleeve and cooperable therewith to clamp said jaw elements in said apertures for grinding purposes, an integral threaded axial extension on said body portion, and an adjusting member threaded on said extension and connected to said sleeve and jaws to shift said sleeve, said jaws, and said spacers axially in said slot, thereby expanding said jaws to engage a workpiece bore.

8. In an expansible arbor having a jaw element movably mounted in a tapered depth slot, the improvement comprising a deformable seal element surrounding said jaw element and engageable with the walls of said slot to produce a sealing relationship, thereby preventing passage of foreign particles between said slot and jaw elements.

9. In an expansible arbor having a jaw element movably mounted in a tapered depth slot, said jaw element having a peripherally extending recess formed thereon, and a deformable seal mounted in said recess and engageable with the walls of said slot in sealing relationship, thereby preventing passage of foreign particles between said slot and jaw element.

BROR ARNE NORDSTROM.

REFERENCES CITED

The following references are of record in the file of this patent:

UNITED STATES PATENTS

| Number | Name | Date |
|---|---|---|
| 292,167 | Lytte | Jan. 22, 1884 |
| 955,180 | Mason | Apr. 19, 1910 |
| 1,361,773 | Raison | Dec. 7, 1920 |
| 1,433,992 | Fennimore | Oct. 31, 1922 |
| 2,277,816 | Brown | Mar. 31, 1942 |